(12) United States Patent
Adamy et al.

(10) Patent No.: US 6,345,206 B1
(45) Date of Patent: Feb. 5, 2002

(54) METHOD FOR CONFIGURING A FUZZY AUTOMATIC-CONTROL DEVICE WHICH IS USED FOR COMPARING A MEASUREMENT SIGNAL WITH A PATTERN SIGNAL

(75) Inventors: Juergen Adamy, Rossdorf; Joachim Freitag, Hopfersradt; Steffen Lorenz, Grossbreitenbach, all of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/318,799

(22) Filed: May 26, 1999

Related U.S. Application Data (63) Continuation of application No. PCT/DE97/02703, filed on Nov. 18, 1997.

(30) Foreign Application Priority Data

Nov. 28, 1996 (DE) .......................................... 196 49 438

(51) Int. Cl.$^7$ .............................................. G05B 13/02
(52) U.S. Cl. ........................................ 700/50; 706/903
(58) Field of Search ............................ 700/50, 28, 47, 700/54; 706/900, 903, 906, 902, 1, 52, 49

(56) References Cited

U.S. PATENT DOCUMENTS

| | | | | |
|---|---|---|---|---|
| 5,303,385 A | * | 4/1994 | Hattori et al. | 700/50 |
| 5,708,341 A | * | 1/1998 | Ishida | 318/561 |
| 5,909,370 A | * | 6/1999 | Lynch | 700/50 |
| 5,930,136 A | * | 7/1999 | Nakajima et al. | 700/48 |
| 6,181,975 B1 | * | 1/2001 | Gross et al. | 700/29 |
| 6,216,048 B1 | * | 4/2001 | Keeler et al. | 700/44 |

FOREIGN PATENT DOCUMENTS

| | | |
|---|---|---|
| DE | 4308194 A1 | 9/1994 |
| DE | 4415208 A1 | 11/1995 |
| DE | 4442087 A1 | 5/1996 |
| EP | 0753802 A1 | 1/1997 |
| JP | 04172160 | 6/1992 |
| WO | 96/31304 | 10/1996 |

OTHER PUBLICATIONS

Hatanaka et al., "Breakout Forecasting System Based On Multiple Neural Networks For Continuous Casting in Steel Production," *Fujitsu Scientific & Technical Journal*, Bd. 29, No. 3, Sep. 21, 1993, pp. 265–270.

\* cited by examiner

*Primary Examiner*—William Grant
*Assistant Examiner*—Zoila Gabrera
(74) *Attorney, Agent, or Firm*—Sughrue Mion, PLLC (57) ABSTRACT

The method according to the present invention is used for automatically configuring a fuzzy automatic-control device, in the form of generating transformation criteria. These transformation criteria preferably have change, stop, jump-back and reset rules for the individual states of the fuzzy automatic-control device that represent recognition probabilities. The method allows transformation criteria for configuring fuzzy automatic-control devices to be produced fully automatically by the arithmetic logic unit. Even if the pattern signals change frequently, the fuzzy automatic-control device can thus be reconfigured quickly, flexibly and without complications.

23 Claims, 4 Drawing Sheets

FIG 7a — Z1, 1ST STATE

|    | f1' | f2' | f3' | f4' | f5' |
|----|-----|-----|-----|-----|-----|
| f6 | 1 | 1 | 1 | 1 | 1 |
| f5 | 1 | 1 | 1 | 1 | 1 |
| f4 | 1 | 1 | 1 | 1 | 1 |
| f3 | 1 | 1 | 2 | 1 | 1 |
| f2 | 1 | 1 | 1 | 1 | 1 |
| f1 | 1 | 1 | 1 | 1 | 1 |

A1, D1

FIG 7b — Z2, 2ND STATE

|    | f1' | f2' | f3' | f4' | f5' |
|----|-----|-----|-----|-----|-----|
| f6 | 1 | 1 | 1 | 1 | 1 |
| f5 | 1 | 1 | 1 | 1 | 1 |
| f4 | 1 | 1 | 1 | 1 | 1 |
| f3 | 1 | 1 | 2 | 3 | 1 |
| f2 | 1 | 1 | 1 | 1 | 1 |
| f1 | 1 | 1 | 1 | 1 | 1 |

D2, B2, A2

FIG 7c — Z3, 3RD STATE

A3, B3

|    | f1' | f2' | f3' | f4' | f5' |
|----|-----|-----|-----|-----|-----|
| f6 | 1 | 1 | 1 | 1 | 1 |
| f5 | 1 | 1 | 4 | 5 | 1 |
| f4 | 1 | 1 | 3 | 4 | 1 |
| f3 | 1 | 1 | 2 | 3 | 1 |
| f2 | 1 | 1 | 1 | 1 | 1 |
| f1 | 1 | 1 | 1 | 1 | 1 |

C3, D3

FIG 7d — Z4, B4, 4TH STATE, C4

|    | f1' | f2' | f3' | f4' | f5' |
|----|-----|-----|-----|-----|-----|
| f6 | 1 | 1 | 1 | 1 | 1 |
| f5 | 1 | 4 | 4 | 5 | 1 |
| f4 | 1 | 3 | 3 | 3 | 1 |
| f3 | 1 | 2 | 1 | 3 | 1 |
| f2 | 1 | 1 | 1 | 1 | 1 |
| f1 | 1 | 1 | 1 | 1 | 1 |

A4, D4

FIG 7e — Z5, C5, 5TH STATE

|    | f1' | f2' | f3' | f4' | f5' |
|----|-----|-----|-----|-----|-----|
| f6 | 1 | 1 | 1 | 1 | 1 |
| f5 | 1 | 4 | 4 | 1 | 1 |
| f4 | 1 | 3 | 3 | 1 | 1 |
| f3 | 1 | 2 | 1 | 1 | 1 |
| f2 | 1 | 2 | 2 | 1 | 1 |
| f1 | 1 | 1 | 1 | 1 | 1 |

B5, A5, D5

FIG 7f — Z6, D6, 6TH STATE, A6

|    | f1' | f2' | f3' | f4' | f5' |
|----|-----|-----|-----|-----|-----|
| f6 | 1 | 1 | 1 | 1 | 1 |
| f5 | 1 | 1 | 1 | 1 | 1 |
| f4 | 1 | 1 | 1 | 1 | 1 |
| f3 | 1 | 5 | 6 | 7 | 1 |
| f2 | 1 | 5 | 6 | 1 | 1 |
| f1 | 1 | 1 | 1 | 1 | 1 |

C6, B6

FIG 7g — Z7, A7, 7TH STATE, D7

|    | f1' | f2' | f3' | f4' | f5' |
|----|-----|-----|-----|-----|-----|
| f6 | 1 | 1 | 1 | 1 | 1 |
| f5 | 1 | 1 | 1 | 1 | 1 |
| f4 | 1 | 1 | 1 | 1 | 1 |
| f3 | 1 | 1 | 6 | 7 | 1 |
| f2 | 1 | 1 | 6 | 6 | 1 |
| f1 | 1 | 1 | 1 | 1 | 1 |

C7, B7

FIG 7h — Z8, 8TH STATE

|    | f1' | f2' | f3' | f4' | f5' |
|----|-----|-----|-----|-----|-----|
| f6 | 1 | 1 | 1 | 1 | 1 |
| f5 | 1 | 1 | 1 | 1 | 1 |
| f4 | 1 | 1 | 1 | 1 | 1 |
| f3 | 1 | 1 | 1 | 1 | 1 |
| f2 | 1 | 1 | 1 | 1 | 1 |
| f1 | 1 | 1 | 1 | 1 | 1 |

D8

METHOD FOR CONFIGURING A FUZZY AUTOMATIC-CONTROL DEVICE WHICH IS USED FOR COMPARING A MEASUREMENT SIGNAL WITH A PATTERN SIGNAL

This is a Continuation of International Application PCT/DE97/02703, with an international filing date of Nov. 18, 1997, the disclosure of which is incorporated into this application by reference.

BACKGROUND OF THE INVENTION

1. Field of the Invention

The present invention relates to new and useful improvements to a fuzzy automatic-control device which is used for comparing a measurement signal with a pattern signal.

2. Description of the Related Art

The PCT application having publication number WO 96/31 304 describes a device for early break-out recognition in a continuous casting plant. To recognize break-out at an early stage, the surface temperature of the cast strand is detected using temperature sensors. These temperature sensors are arranged distributed in a mold around the strand, and their output is then evaluated. To do this, each of the temperature sensors has an associated pattern recognition device, which uses the detected temperature and an internal state variable (representing the previous temperature profile) to update the internal state variable on the basis of fuzzy conclusions and, on the output side, to produce an up-to-date predicted value for the probability of break-out. The pattern recognition device has a fuzzy control unit using fuzzy logic. In this case, the fuzzy control unit uses rules in the form of tables based on linguistic values of input variables, for example the temperature. These rules are used to define the preconditions for the pattern recognition device to change or maintain the internal state, that is to say the processing state of the fuzzy control unit, and thus to define the present predicted value for the break-out probability.

One disadvantage of the known pattern recognition device is that the fuzzy rules used for the fuzzy logic have to be produced by a specialist, by hand. Since a complete set of rules has to be produced for each processing state in the fuzzy control unit, configuring the fuzzy logic in the known pattern recognition device is tedious and time consuming.

It is also a disadvantage that pattern recognition device fuzzy logic configured with rules in this way can recognize only one specific pattern. If the pattern recognition device is intended to recognize a new, different pattern, for example after a change to the continuous casting plant, then new rules for configuring the fuzzy logic must once again be designed by hand, by a specialist and based on his/her specialized knowledge.

SUMMARY OF THE INVENTION

It is therefore a first object of the present invention to provide a method for using a programmable arithmetic logic unit to configure a fuzzy automatic-control device which is used for comparing a measurement signal with a pattern signal. Another object of the present invention is to provide a method for configuring a fuzzy automatic-control device which ameliorates the disadvantages of the related art discussed above.

These and other objects are achieved by a method according to the invention for configuring a fuzzy automatic-control device, which is used for comparing a measurement signal to be analyzed with a pattern signal, by means of a programmable arithmetic logic unit. According to one formulation, the invention is directed to a method that includes:

a) selecting characteristic points in a pattern profile of the pattern signal;

b) imaging the pattern signal into an input value range of the fuzzy automatic-control device;

c) generating feature ranges in the input value range in such a manner that at least the characteristic points are located in the feature ranges;

d) assigning a processing state of the fuzzy automatic-control device to each of the characteristic points to form a sequence of processing states, wherein the fuzzy automatic-control device uses the sequence of processing states to define an extent to which the measurement signal has a measured profile corresponding to the pattern profile;

e) configuring the fuzzy automatic-control device, wherein a transformation criterion is assigned to each of the processing states for each of the feature ranges of the input value range, wherein the fuzzy automatic-control device executes the transformation criterion as a function of a current processing state of the fuzzy automatic-control device in order to change to a subsequent processing state, when the measurement signal passes through one of the feature ranges.

This solution according to the present invention for configuring a fuzzy automatic-control device has the advantage that the device can be configured fully automatically by using the arithmetic logic unit to produce transformation criteria. The pattern signal or signals to be recognized, must be predefined for the arithmetic logic unit, in order to allow the fuzzy automatic-control device to be configured.

The process according to the present invention of configuring the fuzzy automatic-control device has the particular advantage that, if the pattern signals change frequently, the fuzzy automatic-control device can be reconfigured quickly, flexibly and without complications. A pattern signal can thus be "recorded" in the fuzzy automatic-control device even without any specific specialized knowledge.

BRIEF DESCRIPTION OF THE DRAWINGS

The present invention and further advantageous refinements of the present invention according to the features of the dependent claims are explained in more detail below with the aid of diagrammatic, exemplary embodiments in the drawing, in which:

DETAILED DESCRIPTION OF THE PREFERRED EMBODIMENTS

Figure 1:
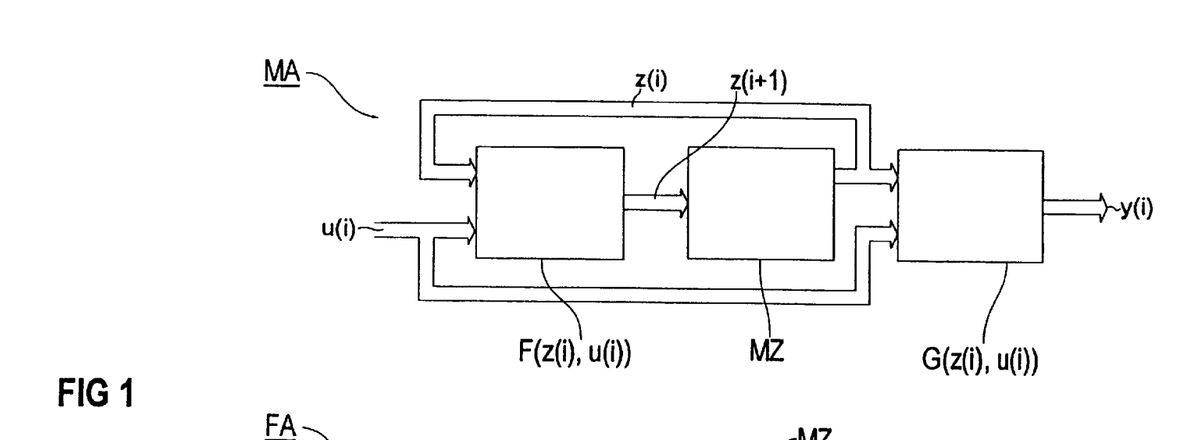
FIG. 1 shows, by way of example, a basic design for a fuzzy automatic-control device.

FIG. 1 shows, by way of example, a generalized design MA of a fuzzy automatic-control device with an input vector u(i), for illustrating the principles of the invention. A first fuzzy logic device F(z(i), u(i)) uses the input vector u(i) and a buffer-stored internal state vector z(i) to produce an updated state vector z(i+1), which is buffer-stored in a memory element MZ. The buffer-stored state vector z(i) and the input vector u(i) are linked to one another in a second fuzzy logic device G(z(i), u(i)) to form an output vector y(i).

Figure 2:
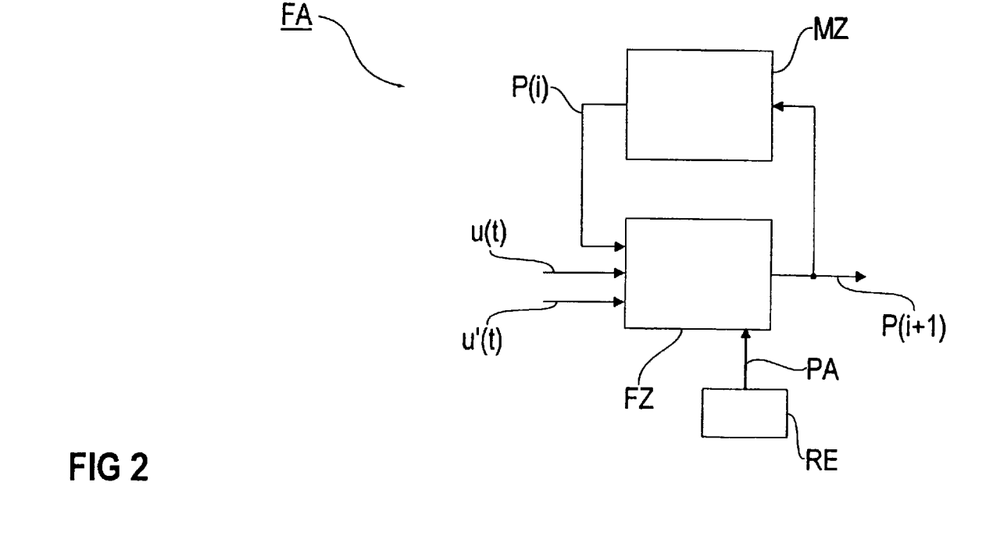
FIG. 2 shows, by way of example, a fuzzy automatic-control device for comparing a measurement signal with a pattern signal.

By way of example, FIG. 2 shows a fuzzy automatic-control device FA with a fuzzy logic device FZ. This corresponds to the fundamental design MA, shown in FIG. 1, of a fuzzy automatic-control device FA, in which case the first fuzzy logic device F(z(i), u(i)) and the second fuzzy logic device G(z(i), u(i)) have a matching transfer function, that is to say FZ=F(z(i), u(i))=G(z(i), u(i)). Furthermore, the input vector u(i) in the example in FIG. 2 comprises the input variables of a first signal u(t) and of a second signal u'(t), which, for example, is the time derivative of the first signal u(t). In the example in FIG. 2, the fuzzy automatic-control device FA has only a single output variable y(i)=P(i+1). This is buffer-stored in a memory element MZ and is fed back as an internal state vector P(i) to the input of the fuzzy logic device FZ. The buffer-stored, internal state vector P(i) in this case corresponds to the recognition probability that a specific signal profile of the input variables u(t) and u'(t) is already present. This is achieved according to the present invention by appropriately configuring a configuration PA of the fuzzy logic device FZ by means of a programmable arithmetic logic unit RE.

The fuzzy automatic-control device FA and the programmable arithmetic logic unit RE may be either hardware or software. The fuzzy automatic-control device FA and the arithmetic logic unit RE can be embodied as separate units or, preferably, a single apparatus, for example using two computer programs installed in a computer.

The fuzzy automatic-control device FA illustrated in FIG. 2 is preferably the "Sugeno" type. The fuzzy logic device FZ in this case fuzzifies the input variables, which are then output via an arithmetic logic unit and, in particular, a subsequent defuzzification device as a recognition level P(i+1). The inference is preferably drawn using the max-min method, and the defuzzification process is based on the centroid method for singletons. The recognition level P(i+1) is a measure of the probability that a specific signal profile, defined by the configuration PA, of the input variables u(t) and u'(t), is present. The buffer-storage and feeding back of the internal state vector P(i) determined in the respectively previous time step make it possible for the fuzzy logic device FZ to compare the actual values of the input variables u(t) and u'(t) with the profile of the pattern signal defined by the configuration PA.

Figure 3:
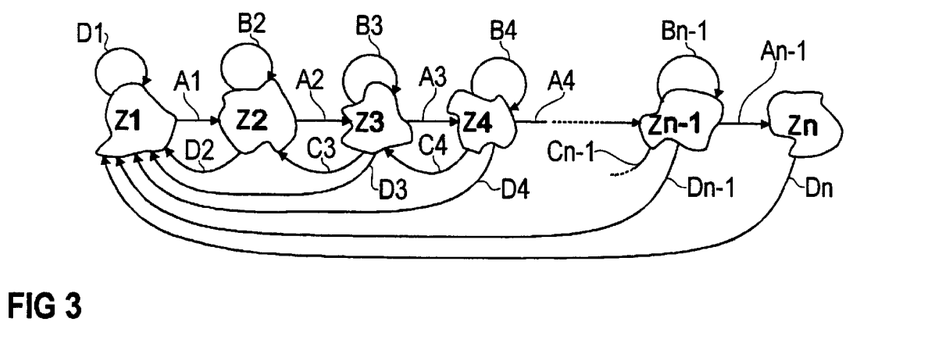
FIG. 3 shows, by way of example, a state diagram for the fuzzy processing states of a fuzzy automatic-control device.

By way of example, FIG. 3 shows a fuzzy state diagram for the fuzzy automatic-control device FA. The nodes on the state diagram map the possible processing states Z1, Z2, ..., Zn–1, Zn in which the fuzzy automatic-control device FA may be. The higher the respective processing state Z1 ... Zn that the fuzzy automatic-control device FA is currently in, the greater is the probability that a specific signal profile of the input variables u(t) and u'(t) is already present. In this case, the processing states Z1 ... Zn are described, in particular, by so-called "linguistic variables" in the fuzzy logic device FZ, and are subsequently used to form the recognition level P(i+1). The processing states Z1 ... Zn are described, as being "fuzzy" since, in contrast to binary automatic-control devices, the fuzzy automatic-control device FA can assume a number of processing states at the same time, with specific probability ratios.

The conditions for the fuzzy automatic-control device FA to change between the individual processing states Z1 ... Zn are described by transformation criteria, which are indicated in FIG. 3 by arrows with the reference symbols A1 ... An–1,B2, ... ,Dn. These transformation criteria indicate whether the fuzzy automatic-control device FA will change its processing state. The transformation criteria are composed, in particular, of change rules A1 ... An–1 in response to which the fuzzy automatic-control device FA changes from a current processing state to a next-higher processing state, stop rules B2 ... Bn–1 in response to which the fuzzy automatic-control device FA remains in a current processing state, jump-back rules C3 ... Cn–1 in response to which the fuzzy automatic-control device FA jumps back from a current processing state to a next-lower processing state, as well as reset rules D1 ... Dn in response to which the fuzzy automatic-control device FA jumps back from a current processing state to the lowest processing state, that is to say the first processing state Z1.

Figure 4:
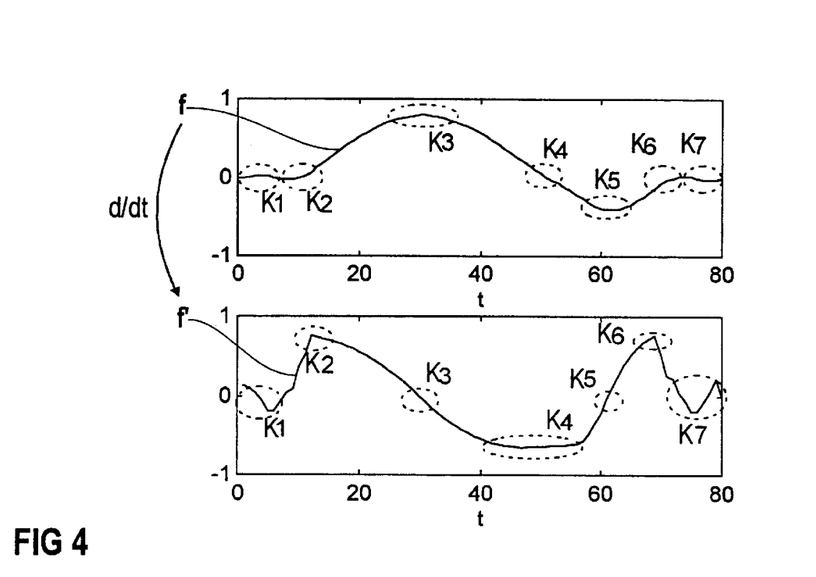
FIG. 4 shows an example of the signal profile of a signal f and its derivative f', in which the areas outlined by dashed lines denote selected points on the signal profiles.

FIG. 4 shows an example of the signal profile for a signal f and its time derivative f'. The signals f and f1' are preferably shown scaled in normalized form and, in the following exemplary embodiment, are used for configuring the fuzzy automatic-control device FA illustrated in FIG. 2. The fuzzy automatic-control device FA illustrated in FIG. 2 is used to compare a measurement signal, for example the actual values of the input variables u(t) and u'(t), with a pattern signal. In the example in FIG. 4, the pattern signal is formed by the illustrated signals f and f1'. The pattern signal is not necessarily composed of a basic signal and its first derivative, but may also include higher derivatives or other signals.

According to the invention, the programmable arithmetic logic unit RE selects points K1 ... K7 on the profile of the pattern signal. The selected points K1 ... K7 are also referred to as characteristics of the pattern signal. The points may be, for example, randomly selected points or points taken at equal intervals from the profile of the pattern signal. To allow the fuzzy automatic-control device FA to carry out signal comparison efficiently and quickly, only part of the complete signal profile of the pattern signal is thus used for the comparison with the measurement signal. In an advantageous embodiment of the invention, the arithmetic logic unit RE defines the selected points K1 ... K7 in such a manner that they are characteristic of the profile of the pattern signal. The selected points K1 ... K7 on the signal profile of the pattern signal advantageously have mathematically characteristic properties. They are preferably extreme values, zero points and/or points of inflection. In the example in FIG. 4, the selected points K1 ... K7 on the signals f and f' forming the pattern signal are those for which the signal f or its derivative f' is either at an extreme or at zero.

According to the invention, the programmable arithmetic logic unit RE illustrated in FIG. 2 assigns a processing state Z1 ... Zn of the fuzzy automatic-control device FA to each of the points K1 ... K7 selected by way of example in FIG. 4. The fuzzy automatic-control device FA thus uses a sequence of thus-formed processing states Z1 ... Zn to define an extent to which a measurement signal composed of the input variables u(t), u'(t) has a profile which corresponds to a pattern signal composed, by way of example, of the input variables f, f'. In relation to the state diagrams illustrated in FIG. 3, the programmable arithmetic logic unit RE assigns a processing state Z1 . . . Zn of the fuzzy automatic-control device FA to each of the seven selected points K1 . . . K7. A first processing state Z1 is preferably used as a basic state in this case. With respect to the example of the pattern signal in FIG. 4, which is composed of the signals f and f', this thus results in eight processing states Z1 . . . Z8 of the fuzzy automatic-control device FA.

The fuzzy automatic-control device FA moves within the sequence of processing states Z1 . . . Z8 which are illustrated in FIG. 3. The processing states Z1 . . . Z8 in this case correspond to the selected points K1 . . . K7 of the signals f and f', which have already been recognized by the fuzzy automatic-control device FA. The higher a processing state Z1 . . . Zn assumed by the fuzzy automatic-control device FA in this case, the greater is the level of probability that a measurement signal to be analyzed has a profile which corresponds to the pattern signal which is present in the form of the configuration PA of the fuzzy automatic-control device FA. If the fuzzy automatic-control device FA assumes the highest processing state Zn or Z8, then it has recognized, in the measurement signal to be analyzed, a profile which corresponds to the pattern signal.

Figure 5:
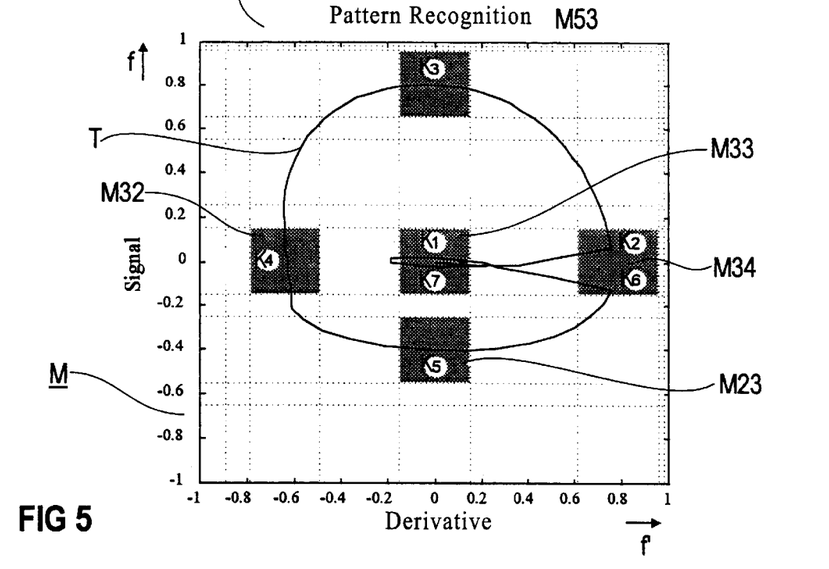
FIG. 5 shows, by way of example, the input value range of the fuzzy automatic-control device, with the signal profiles f and f' illustrated in FIG. 4 forming the pattern signal T in the form of a trajectory.

FIG. 5 shows the signals f and f' illustrated in FIG. 4 as a pattern signal T which is in the form of a trajectory. According to the invention, the pattern signal T is mapped by the programmable arithmetic logic unit RE into an input value range M of the fuzzy automatic-control device FA. Furthermore, the programmable arithmetic logic unit RE also maps the selected points K1 . . . K7 and, according to the invention, generates so-called feature ranges M34, M53, M32, M23 in the input value range M, in such a manner that at least the selected points K1 . . . K7 are located in these feature ranges M34, M53, M32, M23. In the example in FIG. 5, the selected points K1 . . . K7 are not shown in the form of points, but are bounded as feature ranges M33, M34, M53, M32, M23 illustrated by gray areas. In this example, the feature range M53 in this case indicates a maximum, and the feature range M23 indicates a minimum of the signal f, or a zero point of the signal f'.

Figure 6:
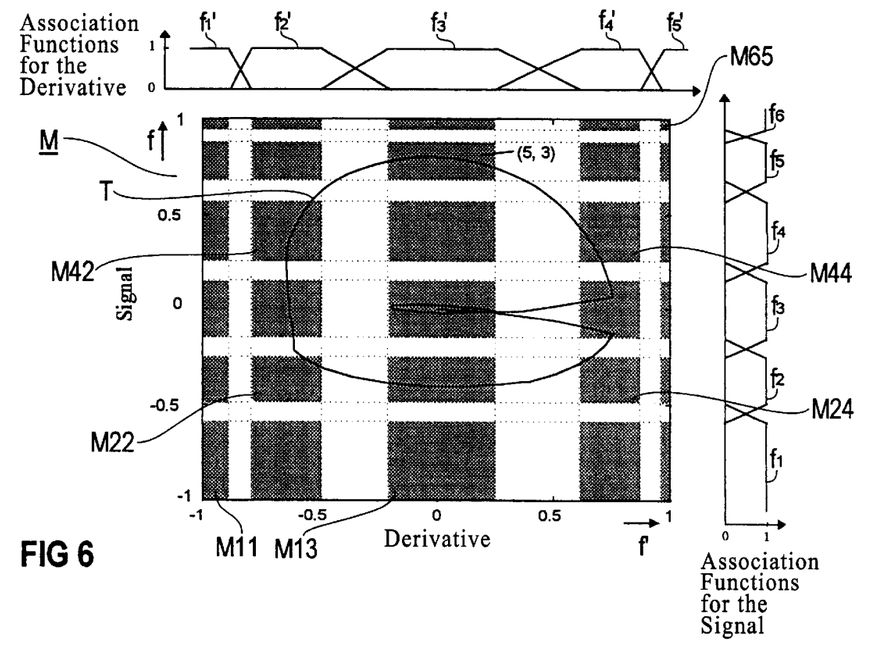
FIG. 6 illustrates the input value range from FIG. 5 with the feature ranges illustrated by gray areas.

FIG. 6 once again shows the normalized input value range M from FIG. 5. In order to improve the detection of the profile of the pattern signal T and including the feature ranges M33, M34, M53, M32, M23 which bound the selected points K1 . . . K7, the programmable arithmetic logic unit RE preferably generates further feature ranges M11 . . . M65, which are illustrated by gray areas. Located between these areas in FIG. 6 there are change regions which are bounded by gridlines and are illustrated by white areas, so that the normalized input value range M is completely covered by feature ranges M11 . . . M65 and change regions. The programmable arithmetic logic unit RE, in particular, assigns association functions f1 . . . f6, f1'. . . f5' of the fuzzy logic device FZ illustrated in FIG. 2 to the feature ranges M11 . . . M65. In this case, the feature ranges M11 . . . M65 represent, in particular, the core region of the association functions f1 . . . f6, f1'. . . f5', in which core region these functions have the value 1. The grid lines shown in FIG. 6 are in each case located at the boundaries of the core regions of the association functions f1 . . . f6, f1'. . . f5'. The individual association functions f1 . . . f6, f1'. . . f5' merge linearly into one another in the edge regions so that their sum becomes, in particular, simply unity. By way of example, the reference symbols f1 . . . f6 and f1'. . . f5' are quoted here as linguistic variables, and are also used in the following text to indicate the coordinates of the feature ranges M11 . . . M65.

By way of example, FIGS. 7a to 7h show diagrams which correspond to the Karnaugh maps from Boolean logic of the transformation criteria, produced according to the present invention by the programmable arithmetic logic unit RE, of the individual processing states Z1 . . . Z8 of the fuzzy automatic-control device FA. According to the invention, the programmable arithmetic logic unit RE for the configuration PA of the fuzzy automatic-control device FA in each case assigns a transformation criterion to each processing state Z1 . . . Z8 for each feature range M11 . . . M65 of the input value range M, which transformation criteria are shown in FIGS. 7a to 7h by the reference symbols Z1 . . . Z8, f1 . . . f6, f1'. . . f5', A1 . . . An–1, B2 . . . Bn–1, C3 . . . Cn–1, D1 . . . Dn. The fuzzy automatic-control device FA executes this as a function of the current processing state Z1 . . . Zn when the measurement signal u(t) and u'(t) to be analyzed passes through a feature range M11 . . . M65, in order to change to a subsequent processing state Z1 . . . . Z8. When the fuzzy automatic-control device FA changes to a subsequent processing state Z1 . . . Z8, the device thus changes from the current processing state Z1 . . . Z8 to a higher or lower processing state Z1 . . . Z8 or retains this current processing state Z1 . . . . Z8.

With respect to the state graphs which are shown by way of example in FIG. 3, FIGS. 7a to 7h show the transformation criteria for each processing state of the fuzzy automatic-control device FA, these transformation criteria having the change rules A1 . . . A7, the stop rules B2 . . . B7, the jump-back rules C3 . . . C7 and the reset rules D1 . . . D8. The numbers in the boxes denoted by the coordinates Z1 . . . Z8, f1 . . . f6, f1'. . . f5' in this case indicate the subsequent processing state Z1 . . . Z8 of the fuzzy automatic-control device FA resulting from the corresponding transformation criterion.

According to the invention, the fuzzy automatic-control device FA is configured by the programmable arithmetic logic unit RE which, starting with the fuzzy automatic-control device FA in a first processing state Z1, defines the sequence of feature ranges M11 . . . M65 which the pattern signal T must pass through along its profile. By way of example, FIGS. 7a to 7h in this case show the transformation criteria Z1 . . . Z8, f1 . . . f6, f1'. . . f5' for the respective operating states Z1 . . . Z8 of the fuzzy automatic-control device FA. In particular, the programmable arithmetic logic unit RE selects from the totality of feature ranges M11 . . . M65 those feature ranges M23, M32, M33, M34, M53 in which a selected point K1 . . . K7 of the pattern signal T is located. Furthermore, the feature range M33 is defined, in which the last selected point K7 of the pattern signal T is located, and the feature ranges M22, M24, M42, M44, in which no selected point K1 . . . K7 of the pattern signal T is located.

In particular, all the transformation criteria for the processing states Z1 . . . Z8 are initially defined by the programmable arithmetic logic unit RE by means of reset rules D1 . . . D8 such that the fuzzy automatic-control device FA jumps back to the first processing state Z1. This means that, subsequently, the fuzzy automatic-control device FA is reset to the initial state Z1 again in the event of any discrepancy between a measurement signal u(t), u'(t) to be analyzed and the pattern signal T.

If a selected point K1 . . . K7 is located in a feature range M11 . . . M65 defined along the profile of the pattern signal T, the programmable arithmetic logic unit RE defines the corresponding transformation criterion for the current processing state Zk such that the fuzzy automatic-control device FA changes to the next-higher processing state Zk+1. The corresponding transformation criterion for the next-higher processing state is defined such that the fuzzy automatic-control device FA remains in the next-higher processing state, and the corresponding transformation criterion for the next-plus-one processing state Zk+2 is defined such that the fuzzy automatic-control device FA jumps back to the next-higher processing state. In order to define further transformation criteria, the programmable arithmetic logic unit RE uses the next-higher processing state of the fuzzy automatic-control device FA as the new current processing state.

Figure 7A:
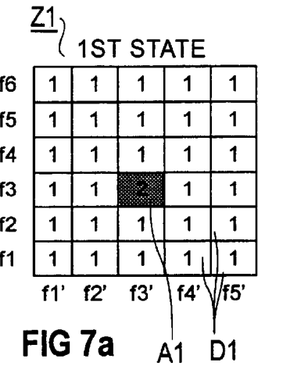
FIGS. 7a–7h show, by way of example, Karnaugh maps of the transformation criteria, defined according to the present invention by the arithmetic logic unit, for the individual processing states of the fuzzy automatic-control device.
Figure 7B:
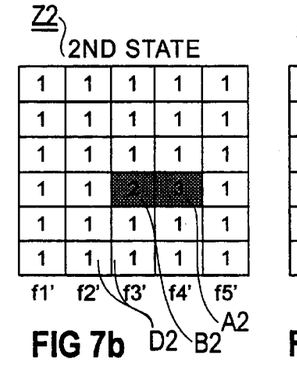

With respect to the example illustrated in FIG. 7a, the fuzzy automatic-control device FA is initially in the processing state Z1. When the programmable arithmetic logic device RE recognizes the first selected point K1 in the field f3/f3' in the measurement signal to be analyzed, the processing state of the fuzzy automatic-control device FA should change to the next-higher processing state Z2. The transformation criterion in the field f3/f3' of the first processing state Z1 therefore uses the change rule A1 to change the fuzzy automatic-control device FA to the next-higher, second processing state Z2. In the next-higher, second processing state Z2, the transformation criterion in the field f3/f3' uses the stop rule B2 to ensure that the fuzzy automatic-control device FA remains in this next-higher, second processing state Z2. In the second-higher, third processing state Z3, the transformation criterion in the field f3/f3' uses the jump-back rule C3 to cause the fuzzy automatic-control device FA to jump back to the second processing state Z2.

If the last selected point K7 is located in a feature range M11 . . . M65 defined along the profile of the pattern signal T, the programmable arithmetic logic unit RE defines the corresponding transformation criterion A7 for the current processing state Z7 such that the fuzzy automatic-control device FA changes to the next-higher processing state Z8. All the transformation criteria for the next-higher processing state Z8 have already been defined by means of reset rules D8, in particular, such that the fuzzy automatic-control device FA jumps back to the first processing state Z1.

If no selected point K1 . . . K7 is located in a feature range M11 . . . M65 defined along the profile of the pattern signal T, the programmable arithmetic logic unit RE defines the corresponding transformation criterion for the current processing state such that the fuzzy automatic-control device remains in the current processing state. The corresponding transformation criterion for the next-higher processing state is defined such that the fuzzy automatic-control device jumps back to the current processing state.

Figure 7C:
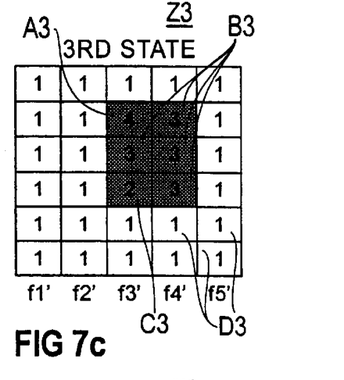
Figures 7D, 7E:
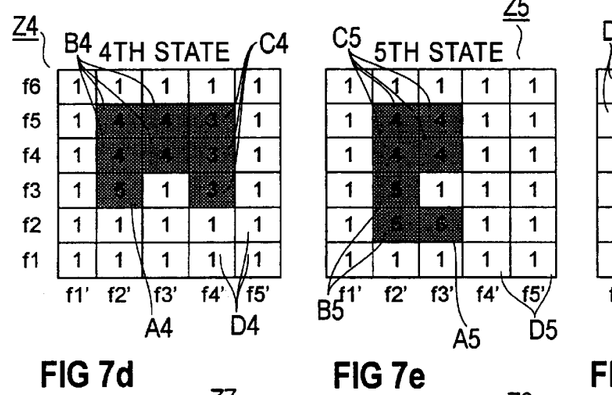
Figure 7F:
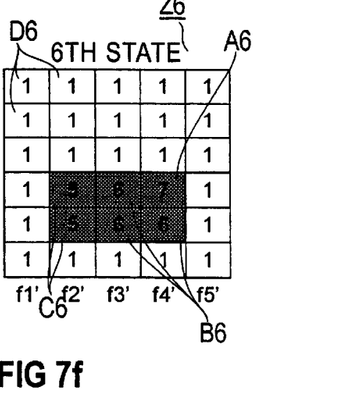
Figure 7G:
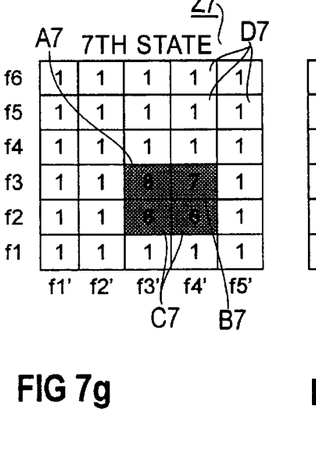
Figure 7H:
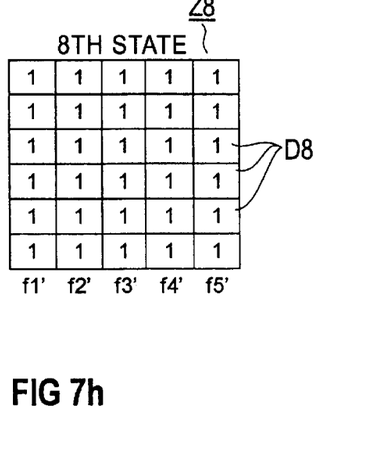

In the example in FIG. 7c, the profile of the pattern signal T in the third processing state Z3 intersects a feature range which is represented by the field f4/f4' without any selected point K1 . . . K7 of the pattern signal T being located there. The transformation criterion in the field f4/f4' of the third processing state Z3 therefore uses the stop rule B3 to ensure that the fuzzy automatic-control device FA remains in the current, third processing state Z3. In the next-higher, fourth processing state Z4, the transformation criterion in the field f4/f4' uses the jump-back rule C4 to cause the fuzzy automatic-control device FA to jump back to the third processing state Z3.

In the situation when two successive feature ranges M11 . . . M65 are arranged diagonally with respect to one another in the sequence of the feature ranges M11 . . . M65 through which the pattern signal T passes in the input value range M, the programmable arithmetic logic unit RE advantageously defines at least the corresponding transformation criteria for those feature ranges M11 . . . M65 in the current processing state which are located in between these ranges and to the side of them, such that the fuzzy automatic-control device FA remains in the current processing state. These are, in particular, the feature ranges M11 . . . M65, which are located in the area of a rectangle which is cornered by the two successive feature ranges M11 . . . M65, which are arranged diagonally with respect to one another as corner regions. In the next-higher processing state, the corresponding transformation criteria are defined such that the fuzzy automatic-control device jumps back to the current processing state.

In the example in FIG. 7c, the fields f4/f4' and f5/f3' are diagonal with respect to one another, which means that the transformation criterion in the field f5/f3' causes the fuzzy automatic-control device FA to change to the next-higher, fourth operating state Z4. The transformation criteria for the fields f4/f3' and f5/f4' which are located in between them and to the side of them use the stop rules B3 to ensure that the fuzzy automatic-control device FA remains in the current, third processing state.

In an advantageous embodiment of the method according to the invention, this method is used in a device for early break-out recognition in continuous casting plant. In this case, the pattern signal T includes at least the profile of a temperature signal which leads to break-out of the cast strand. The measurement signal u(t), u'(t) to be analyzed in this case includes at least the actual value of the temperature of the cast strand.

One advantage of the method for using a programmable arithmetic logic unit for configuring a fuzzy automatic-control device which is used for comparing a measurement signal with a pattern signal is that transformation criteria for configuring the fuzzy automatic-control device are produced fully automatically by the arithmetic logic unit. Even if the pattern signals change frequently, the fuzzy automatic-control device can thus be reconfigured quickly, without complications and flexibly.

The above description of the preferred embodiments has been given by way of example. From the disclosure given, those skilled in the art will not only understand the present invention and its attendant advantages, but will also find apparent various changes and modifications to the structures and processes disclosed. It is sought, therefore, to cover all such changes and modifications falling within the spirit and scope of the invention, as defined by the appended claims, and equivalents thereof.

What is claimed is:

1. A method for configuring a fuzzy automatic-control device, which is used for comparing a measurement signal to be analyzed with a pattern signal, by means of a programmable arithmetic logic unit, said method comprising:
   a) selecting characteristic points in a pattern profile of said pattern signal;
   b) imaging said pattern signal into an input value range of said fuzzy automatic-control device;
   c) generating feature ranges in said input value range in such a manner that at least said characteristic points are located in said feature ranges;
   d) assigning a processing state of the fuzzy automatic-control device to each of said characteristic points to form a sequence of processing states, wherein said fuzzy automatic-control device uses said sequence of processing states to define an extent to which said measurement signal has a measured profile corresponding to said pattern profile; and e) configuring said fuzzy automatic-control device, wherein a transformation criterion is assigned to each of said processing states for each of said feature ranges of said input value range, wherein said fuzzy automatic-control device executes said transformation criterion as a function of a current processing state of said fuzzy automatic-control device in order to change to a subsequent processing state, when said measurement signal passes through one of said feature ranges.

2. The method for configuring a fuzzy automatic-control device as claimed in claim 1, wherein, starting from a first processing state of said fuzzy automatic-control device, said programmable arithmetic logic unit identifies a pattern signal sequence of feature ranges that coincide with said pattern signal, further comprising:

a) selecting characteristic feature ranges in which at least one of said characteristic points of said pattern signal is located; and b) selecting a last characteristic feature range in which a last one of said characteristic points of said pattern signal.

3. The method for configuring a fuzzy automatic-control device as claimed in claim 2, wherein said programmable arithmetic logic unit initially sets each said transformation criterion for each of said processing states such that said fuzzy automatic-control device jumps back to a first processing state.

4. The method for configuring a fuzzy automatic-control device as claimed in claim 3, wherein for each of said characteristic feature ranges, steps performed by said programmable arithmetic logic unit further comprise:

a) setting a present transformation criterion of a current processing state such that said fuzzy automatic-control device changes to a next-higher processing state;

b) setting a next transformation criterion of said next-higher processing state such that said fuzzy automatic-control device remains in said next-higher processing state;

c) setting a next-plus-one transformation criterion of a next-plus-one higher processing state such that said fuzzy automatic-control device jumps back to said next-higher processing state; and d) using said next-higher processing state of said fuzzy automatic-control device as a new current processing state for defining further transformation criteria.

5. The method for configuring a fuzzy automatic-control device as claimed in claim 3, wherein for said last characteristic feature range, steps performed by said programmable arithmetic logic unit further comprise:

a) setting a present transformation criterion of a current processing state such that said fuzzy automatic-control device changes to a next-higher processing state; and b) setting a next transformation criterion of said next-higher processing state such that said fuzzy automatic-control device jumps back to said first processing state.

6. The method for configuring a fuzzy automatic-control device as claimed in claim 4, wherein for said last characteristic feature range, steps performed by said programmable arithmetic logic unit further comprise:

a) setting said present transformation criterion of said current processing state such that said fuzzy automatic-control device changes to said next-higher processing state; and b) setting said next transformation criterion of said next-higher processing state such that said fuzzy automatic-control device jumps back to said first processing state.

7. The method for configuring a fuzzy automatic-control device as claimed in claim 3, wherein for said feature ranges in said pattern signal sequence that do not contain any of said characteristic points of said pattern signal, steps performed by said programmable arithmetic logic unit further comprise:

a) setting a present transformation criterion of a current processing state such that said fuzzy automatic-control device remains in said current processing state; and b) setting a next transformation criterion of a next-higher processing state such that said fuzzy automatic-control device jumps back to said current processing state.

8. The method for configuring a fuzzy automatic-control device as claimed in claim 4, wherein for said feature ranges in said pattern signal sequence that do not contain any of said characteristic points of said pattern signal, steps performed by said programmable arithmetic logic unit further comprise:

a) setting said present transformation criterion of a current processing state such that said fuzzy automatic-control device remains in said current processing state; and b) setting said next transformation criterion of said next-higher processing state such that said fuzzy automatic-control device jumps back to said current processing state.

9. The method for configuring a fuzzy automatic-control device as claimed in claim 5, wherein for said feature ranges in said pattern signal sequence that do not contain any of said characteristic points of said pattern signal, steps performed by said programmable arithmetic logic unit further comprise:

a) setting said present transformation criterion of a current processing state such that said fuzzy automatic-control device remains in said current processing state; and b) setting said next transformation criterion of said next-higher processing state such that said fuzzy automatic-control device jumps back to said current processing state.

10. The method for configuring a fuzzy automatic-control device as claimed in claim 6, wherein for said feature ranges in said pattern signal sequence that do not contain any of said characteristic points of said pattern signal, steps performed by said programmable arithmetic logic unit further comprise:

a) setting said present transformation criterion of a current processing state such that said fuzzy automatic-control device remains in said current processing state; and b) setting said next transformation criterion of said next-higher processing state such that said fuzzy automatic-control device jumps back to said current processing state.

11. The method for configuring a fuzzy automatic-control device as claimed in claim 3, wherein when two successive feature ranges are arranged diagonally with respect to one another in said pattern signal sequence, steps performed by said programmable arithmetic logic unit further comprise:

a) setting present corresponding transformation criteria of a current processing state of cross-diagonal feature ranges, which are located substantially adjacent to both of said two successive feature ranges, such that said fuzzy automatic-control device remains in said current processing state; and b) setting next corresponding transformation criteria of a next-higher processing state of said cross-diagonal feature ranges such that said fuzzy automatic-control device jumps back to said current processing state.

12. The method for configuring a fuzzy automatic-control device as claimed in claim 4, wherein when two successive feature ranges are arranged diagonally with respect to one another in said pattern signal sequence, steps performed by said programmable arithmetic logic unit further comprise:
   a) setting present corresponding transformation criteria of said current processing state of cross-diagonal feature ranges, which are located substantially adjacent to both of said two successive feature ranges, such that said fuzzy automatic-control device remains in said current processing state; and
   b) setting next corresponding transformation criteria of said next-higher processing state of said cross-diagonal feature ranges such that said fuzzy automatic-control device jumps back to said current processing state.

13. The method for configuring a fuzzy automatic-control device as claimed in claim 5, wherein when two successive feature ranges are arranged diagonally with respect to one another in said pattern signal sequence, steps performed by said programmable arithmetic logic unit further comprise:
   a) setting present corresponding transformation criteria of said current processing state of cross-diagonal feature ranges, which are located substantially adjacent to both of said two successive feature ranges, such that said fuzzy automatic-control device remains in said current processing state; and
   b) setting next corresponding transformation criteria of said next-higher processing state of said cross-diagonal feature ranges such that said fuzzy automatic-control device jumps back to said current processing state.

14. The method for configuring a fuzzy automatic-control device as claimed in claim 6, wherein when two successive feature ranges are arranged diagonally with respect to one another in said pattern signal sequence, steps performed by said programmable arithmetic logic unit further comprise:
   a) setting present corresponding transformation criteria of said current processing state of cross-diagonal feature ranges, which are located substantially adjacent to both of said two successive feature ranges, such that said fuzzy automatic-control device remains in said current processing state; and
   b) setting next corresponding transformation criteria of said next-higher processing state of said cross-diagonal feature ranges such that said fuzzy automatic-control device jumps back to said current processing state.

15. The method for configuring a fuzzy automatic-control device as claimed in claim 7, wherein when two successive feature ranges are arranged diagonally with respect to one another in said pattern signal sequence, steps performed by said programmable arithmetic logic unit further comprise:
   a) setting present corresponding transformation criteria of said current processing state of cross-diagonal feature ranges, which are located substantially adjacent to both of said two successive feature ranges, such that said fuzzy automatic-control device remains in said current processing state; and
   b) setting next corresponding transformation criteria of said next-higher processing state of said cross-diagonal feature ranges such that said fuzzy automatic-control device jumps back to said current processing state.

16. The method for configuring a fuzzy automatic-control device as claimed in claim 8, wherein when two successive feature ranges are arranged diagonally with respect to one another in said pattern signal sequence, steps performed by said programmable arithmetic logic unit further comprise:
   a) setting present corresponding transformation criteria of said current processing state of cross-diagonal feature ranges, which are located substantially adjacent to both of said two successive feature ranges, such that said fuzzy automatic-control device remains in said current processing state; and
   b) setting next corresponding transformation criteria of said next-higher processing state of said cross-diagonal feature ranges such that said fuzzy automatic-control device jumps back to said current processing state.

17. The method for configuring a fuzzy automatic-control device as claimed in claim 9, wherein when two successive feature ranges are arranged diagonally with respect to one another in said pattern signal sequence, steps performed by said programmable arithmetic logic unit further comprise:
   a) setting present corresponding transformation criteria of said current processing state of cross-diagonal feature ranges, which are located substantially adjacent to both of said two successive feature ranges, such that said fuzzy automatic-control device remains in said current processing state; and
   b) setting next corresponding transformation criteria of said next-higher processing state of said cross-diagonal feature ranges such that said fuzzy automatic-control device jumps back to said current processing state.

18. The method for configuring a fuzzy automatic-control device as claimed in claim 10, wherein when two successive feature ranges are arranged diagonally with respect to one another in said pattern signal sequence, steps performed by said programmable arithmetic logic unit further comprise:
   a) setting present corresponding transformation criteria of said current processing state of cross-diagonal feature ranges, which are located substantially adjacent to both of said two successive feature ranges, such that said fuzzy automatic-control device remains in said current processing state; and
   b) setting next corresponding transformation criteria of said next-higher processing state of said cross-diagonal feature ranges such that said fuzzy automatic-control device jumps back to said current processing state.

19. The method for configuring a fuzzy automatic-control device as claimed in claim 1, wherein said programmable arithmetic logic unit assigns association functions of said fuzzy automatic-control device to said feature ranges.

20. The method for configuring a fuzzy automatic-control device as claimed in claim 1, wherein said pattern signal comprises a basic signal profile and at least one mathematical derivative of said basic signal profile.

21. The method for configuring a fuzzy automatic-control device as claimed in claim 20, wherein said mathematical derivative is a time derative.

22. The method for configuring a fuzzy automatic-control device as claimed in claim 1, wherein said programmable arithmetic logic unit selects said characteristic points representing mathematically characteristic properties of said pattern profile.

23. The method for configuring a fuzzy automatic-control device as claimed in claim 1, wherein said method is used in a device for early break-out recognition in continuous casting plants, wherein
   a) said pattern signal includes at least a time profile of a temperature signal which leads to break-out of a cast strand; and
   b) said measurement signal includes at least an actual value of a temperature of said cast strand.

* * * * *